United States Patent [19]
>
> Merry et al.

[11] Patent Number: 4,865,818

[45] Date of Patent: Sep. 12, 1989

[54] CATALYTIC CONVERTER FOR AUTOMOTIVE EXHAUST SYSTEM

[75] Inventors: Richard P. Merry, White Bear Lake, Minn.; Philip D. Coates, Jr., Hudson, Wis.

[73] Assignee: Minnesota Mining and Manufacturing Co., St. Paul, Minn.

[21] Appl. No.: 85,778

[22] Filed: Aug. 17, 1987

[51] Int. Cl.⁴ ............................................. F01N 3/28
[52] U.S. Cl. ...................................... 422/179; 422/180; 422/221; 60/299; 29/157 R; 29/455.1; 53/66; 53/214; 242/7.01
[58] Field of Search ............... 422/179, 180, 221, 170; 60/299; 29/157 R, 455 R; 53/66, 214; 242/7.01

[56] References Cited

U.S. PATENT DOCUMENTS

| | | | |
|---|---|---|---|
| 4,239,733 | 12/1980 | Foster et al. | 422/179 |
| 4,269,807 | 5/1981 | Bailey et al. | 422/179 |
| 4,343,074 | 8/1982 | Bailey et al. | 422/179 X |
| 4,385,135 | 5/1983 | Langer et al. | 422/179 X |
| 4,617,176 | 10/1986 | Merry | 422/179 |
| 4,750,251 | 6/1988 | Motley et al. | 422/179 X |
| 4,782,661 | 11/1988 | Motley et al. | 422/170 X |

Primary Examiner—Barry S. Richman
Assistant Examiner—Lynn M. Kummert
Attorney, Agent, or Firm—Donald M. Sell; Walter N. Kirn; David W. Anderson

[57] ABSTRACT

Catalytic converters for automotive exhaust systems wherein thin, resilient, flexible, intumescent sheet materials are utilized as mounting mats for catalytic monoliths are disclosed. Multiple wraps of such sheet materials have been found particularly useful and cost effective for positioning and supporting ceramic catalytic monoliths which have a large cross-sectional dimensional tolerance within the metallic casing of the converter.

8 Claims, 1 Drawing Sheet

CATALYTIC CONVERTER FOR AUTOMOTIVE EXHAUST SYSTEM

BACKGROUND OF THE INVENTION

The present invention relates to a catalytic converter utilizing an intumescent mounting mat for mounting a ceramic monolith within a metallic casing to produce a catalytic converter.

Catalytic converters are universally employed for oxidation of carbon monoxide and hydrocarbons and reduction of the oxides of nitrogen in automobile exhaust gases in order to control atomospheric pollution. Due to the relatively high temperatures encountered in these catalytic processes, ceramics have been the natural choice for catalyst supports. Particularly useful supports are provided by ceramic honeycomb structures as described, for example, in U.S. Patent Re 27,747. These ceramic bodies tend to be frangible and have coefficients of thermal expansion differing markedly from the metal, usually stainless steel, casings of the converters. Thus, the mounting means for the ceramic body in the container must provide resistance to mechanical shock due to impact and vibration. Intumescent sheet materials useful as mounting materials for this purpose are described in U.S. Patents 3,916,057, 4,305,992 and 4,617,176 and in U.K. Patent 1,513,808.

Catalytic converters employing intumescent sheet mounting materials generally use a single rectangularly shaped sheet or mat usually having a slot on one end and a complementarily configured tab on the other. The sheet or mat is wrapped around the lateral (outer) peripheral surface of the ceramic monolith with tab and slot engaged. The catalytic converter of U.S. Pat. No. 4,617,176 uses a generally rectangular shaped mat with sinusoidal lengthwise edges to minimize axial stresses in the ceramic monolith but still employs the tab and slot geometry. A disadvantage of such systems is that the tab must fit exactly into the slot to ensure a tight gas seal about the preiphery of the ceramic monolith. Unfortunately, this is difficult to do in an automated process and hand operations are expensive and time consuming.

In addition, since the ceramic monolith has a very large dimensional tolerance (typically ±2mm diameter), the circumference or perimeter of the monolith can vary more than ±6 mm. This means that for a given mat length, the mat will tend to be either too long or too short as the individual ceramic monolith size varies within its tolerance range, fitting exactly only a monolith with an exactly nominal perimeter. Since mat overlap can cause improper shell closure with the attendant risk of mounting failure or crushing of the ceramic monolith, overlap is usually avoided by designing the mat length for a monolith of the maximum perimeter. This ensures that mat overlap will never occur, but also means that the mat will be too short in many cases, leaving a space where the two ends of the mat should come together. This space is undesirable because it provides additional mat edge area for the exhaust gas to impinge upon. Under severe driving conditions this can provide a site for mat erosion to begin. This space also allows more heat to be conducted to the metal shell since hot exhaust gases are in direct contact with the metal shell.

The large tolerance of the ceramic monolith also affects the mount of packing density of the intumescent material. With presently available materials, a minimum mount density of about 0.64 g/cm$^3$ is required to hold the ceramic monolith in place under normal conditions and 0.75 g/cm$^3$ under extreme conditions. The mount density must be kept below about 1.36 g/cm$^3$ for a typical 62 cell/cm$^2$ monolith or monolith breakage can occur either during assembly or in operation. In order to achieve and maintain this mount density range under severe operating conditions, a single mat as thick as 9.8 mm has been used.

SUMMARY OF THE INVENTION

The present invention relates to catalytic converters wherein a thin, resilient, flexible, intumescent mat is utilized to securely mount a ceramic monolith within a metallic casing to produce said converters. It has been found that by using multiple layerwise wraps of a very thin (0.5 to 2.0 mm thick) mat, the tab and slot configuration of prior art catalytic converter mounting mats can be eliminated. The space that usually occurs between adjoining edges of the mounting mat and its associated problems are eliminated. Perhaps even more importantly, the number of layers of wrap used can be tailored to the individual monolith perimeter, thus compensating for the large dimensional tolerance of the ceramic monoliths. Thus, if the monolith is on the small end of the tolerance range, it receives more layers of wrap than a similar monolith on the large end of the tolerance range. Since the cost of producing ceramic monoliths is to a large degree a function of dimensional tolerance required, it is possible to realize a cost savings by relaxing monolith tolerances and compensate for these larger tolerances by varying the number of layers of wrap of thin mat of the present invention when assembling the converter. Since the mat is very thin, the placement of the beginning and ending points of the mat are of little concern.

DETAILED DESCRIPTION OF THE INVENTION

Figure 1:
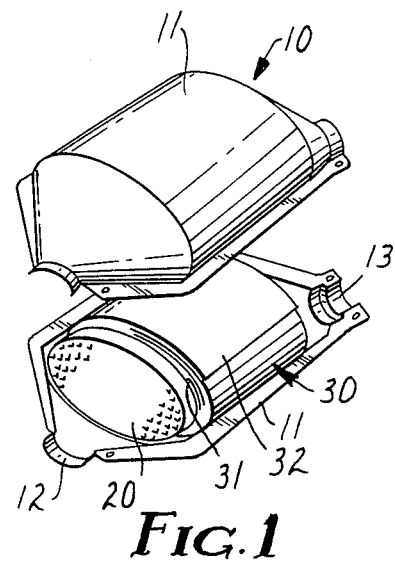
FIG. 1 is a perspective view of a catalytic converter of the present invention shown in disassembled relation.
Figure 2:
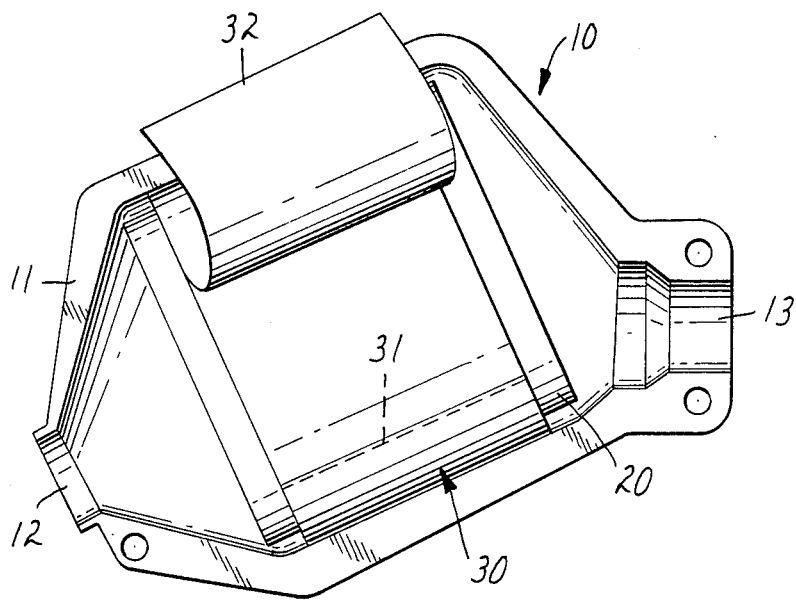
FIG. 2 is a plan view of the bottom shell of the catalytic converter of FIG. 1 showing the layerwise wrapping of the mounting mat about the periphery of the ceramic monolith.

Referring now to the drawings, catalytic converter 10 comprises metallic casing 11 with generally frustoconical inlet and outlet ends 12 and 13, respectively. Disposed within casing 11 is a monolithic catalytic element 20 formed of a refractory material such as ceramic and having a plurality of gas flow channels (not shown) therethrough. Surrounding catalytic element 20 is mounting mat 30 comprising at least two layers of a thin, resilient, flexible, intumescent mounting mat layerwise wrapped about its perimeter which serves to tightly but resiliently support catalytic element 20 within the casing 11 by expansion in situ. The expanded mat then holds the catalytic element 20 in place int he casing and seals the peripheral edges of the catalytic element to thus prevent exhaust gases from by-passing the catalytic element. The mat 30 is layerwise wrapped about the periphery of catalytic element 20 by simply laying down the first end 31 of mat 30, which is in strip form, on catalytic element 20 and layerwise wrapping mat 30 upon itself until the second end 32 of mat 30 rests upon the underlying layers of mat 30 on the surface of catalytic element 20.

The mounting mat for the catalytic converter of this invention comprises a thin, resilient, flexible, intumescent sheet comprising from about 20% to 65% by weight of unexpanded vermiculite flakes, such flakes being either untreated or treated by being ion exchanged with an ammonium compound such as ammonium dihydrogen phospate, ammonium carbonate, ammonium chloride or other suitable ammonium compound; from about 10% to 50% by weight of inorganic fibrous material including aluminosilicate fibers (available commercially under the tradenames Fiberfrax, Cerafiber, and Kaowool), asbestos fibers, glass fibers, zirconia-silica fibers and crystalline alumina whiskers; from about 3% to 20% by weight of binder including natural rubber latices, styrene-butadiene latices, butadiene acrylonitrile latices, latices of acrylate or methacrylate polymers and copolymers and the like; and up to about 40% by weight of inorganic filler including expanded vermiculite, hollow glass microspheres and bentotite. The thin sheet material is made following basic papermaking processes in a thickness of from 0.5 to 2.0 mm. The thus formed sheet material is then slit and wound upon itself into rolls havign widths of from 50 mm to 400 mm. The mounting mat is layerwise wrapped upon itself continuously around a ceramic monolith from 2 to 20 times. The mat can be wrapped to meet a specific final external monolith dimension or the length of the mat material to be wrapped can be predetermined by the initial individual monolith dimension. In either case, the ordinarily large monolith tolerances ($\pm 2$ mm diameter) can be readily compensated for by selecting the proper number of layers of wrap or the length of mat needed. For example, a monolith on the small end of the tolerance range receives more layers of wrap than a monolith on the large end of the tolerance range resulting in mat wrapped monoliths having the same outside perimetrical dimensions. Consequently, very close control of mat mount density of the monolith inserted in the metal canister, is provided.

A thickness of the intumescent sheet greater than 2 mm creates a significant "step" where the mat overlap begins and ends. This stepped area, depending on mat mount density, can be a source of exhaust gas leakage through the mat or a source of high stress concentration in the ceramic monolith. Likewise, a very thin mat, for example below 0.5 mm, is difficult to make and handle and the number of layers of wrap needed becomes excessive. Therefore, the preferred intumescent sheet thickness is from 0.5 to 2.0 mm thick.

Catalytic converters assembled using the sheet material of this invention have the advantage of providing a much more uniform mount density from converter to converter resulting in more consistent performance. In addition, converters mounted utilizing this novel mat do not have a gap existing between mat ends such as is found with tab and slot design mats which, under extreme conditions, can be a source of mat erosion.

EXAMPLES 1-4

Four catalytic converters consisting of an 11.84 cm diameter by 15.24 cm long monolith and a 12.34 cm I.D. (inside diameter) metal container were mounted using multiple wrapped layers of 500 g/cm$^2$ (0.80 mm thick) intumescent sheet material described above. The mount density was determined by calculating the volume of the gap between the ceramic monolith and the container and then cutting the mat material to a length corresponding to the proper mass to mount converters at 0.64, 0.80, 0.96, and 1.12 g/cm$^3$. The monoliths were then subjected to a push-out test at various temperatures on the MTS tensile tester (MTS Systems Corp.) to measure the force needed to move the monolith. This is a measure of how tightly the monolith is held by the mat. Results are listed below.

| | | Push Out Force | | |
|---|---|---|---|---|
| Example | Mount Density (g/cm$^3$) | Room Temperature (Newtons) | 600° C. (Newtons) | Return to Room Temperature (Newtons) |
| 1 | 0.64 | 197 | 6,867 | 2,787 |
| 2 | 0.80 | 631 | 14,520 | 5,053 |
| 3 | 0.96 | 1,323 | >25,000 | 8,705 |
| 4 | 1.12 | 2,317 | >25,000 | 13,630 |

When the monolith did finally move, slippage occurred between the mat and metal can rather than between successive mat layers. These examples indicate that catalytic converters produced with the mounting mats according to this invention generate significant holding force at a wide range of temperatures and mount densities.

EXAMPLE 5

A catalytic converter was mounted as in Examples 1-4 using multiple layers of 500 g/m$^2$ mat (4 layers, 0.80 mm thick) to produce a mount density of 0.64 g/cm$^3$. The converter was then subjected to a hot shake test consisting of a natural gas burner and an Unholtz-Dickie vibration table. Inlet gas temperature was 1000° C., acceleration was 30 Gs in the axial direction at a frequency of 100 Hz. The test continued for 20 hours. No monolith movement or damage such as "ring off" cracking was observed.

What is claimed is:

1. A method of producing a catalytic converter by mounting a ceramic monolith within a metallic catalytic converter casing comprising the steps:

a. providing a metallic converter casing;

b. providing a ceramic monolith having dimensions smaller than the interior dimensions of said metallic converter casing;

c. determining the volume of the gap between the ceramic monolith and the metallic converter casing;

d. layerwise wrapping at least two layers of a thin, resilient, flexible, intumescent sheet material about the periphery of said ceramic monolith, said intumescent sheet having a thickness less than 2 mm and greater than 0.5 mm and comprising from about 20% to 65% by weight of unexpanded vermiculite flakes, from about 10% to 50% by weight of inorganic fibrous material, from about 3% to 20% by weight of binder and up to about 40% by weight of inorganic filler material to yield a mount density of at least 0.64 g/cm$^3$;

e. placing said layerwise wrapped ceramic monolith into said metallic converter casing; and f. closing and sealing said metallic converter casing.

2. In a catalytic converter having a metallic casing, a unitary, solid ceramic catalytic element disposed within said casing, and resilient means disposed between said catalytic element and said metallic casing for positioning said catalytic element and for absorbing mechanical and thermal shock, the improvement comprising:

said resilient means comprising at least two layers of a thin, resilient, flexible, intumescent sheet layerwise wrapped about the perimeter of the lateral surface of the solid ceramic catalytic element.

3. The catalytic converter of claim 2 wherein the thickness of said thin, resilient, flexible, intumescent sheet is greater than 0.5 mm and less than 2.0 mm.

4. The catalytic converter of claim 2 wherein the thin, resilient, flexible, intumescent sheet comprises from about 20% to 65% by weight of unexpanded vermiculite flakes, from about 10% to 50% by weight of inorganic fibrous material, from about 3% to 20% by weight of binder and up to about 40% by weight of inorganic filler material.

5. The catalytic converter of claim 4 wherein the unexpanded vermiculite flakes have been ion-exchanged with an ammonium compound.

6. The catalytic converter of claim 4 wherein the inorganic fibrous material is selected from the group consisting of alumino-silicate fibers, asbestos fibers, glass fibers, zirconia-silica fibers and crystalline alumina whiskers.

7. The catalytic converter of claim 4 wherein the binder is selected from the group consisting of latices of natural rubber, styrene-butadiene copolymers, butadiene-acrylonitrile copolymers, acrylate polymers and methacrylate polymers.

8. The catalytic converter of claim 4 wherein the inorganic filler is selected from the group consisting of expanded vermiculite, hollow glass microspheres and bentonite.

* * * * *